United States Patent [19]
Kondo et al.

[11] 3,975,061
[45] Aug. 17, 1976

[54] POWERED BRAKE SYSTEM FOR VEHICLES

[75] Inventors: Toshiyuki Kondo; Takumi Nishimura, both of Kariya, Japan

[73] Assignee: Aisin Seiki Kabushiki Kaisha, Japan

[22] Filed: May 29, 1974

[21] Appl. No.: 474,215

[30] Foreign Application Priority Data
May 29, 1973  Japan.............................. 48-60032

[52] U.S. Cl....................... 303/21 AF; 188/181 A; 303/10; 303/21 F; 303/68; 303/84 A
[51] Int. Cl.² ......................................... B60T 8/04
[58] Field of Search .......... 303/21 F, 21 AF, 61–63, 303/68–69, 10, 84; 188/181 A, 151 A

[56] References Cited
UNITED STATES PATENTS

| | | | |
|---|---|---|---|
| 3,706,479 | 12/1972 | Klein | 303/21 F |
| 3,708,213 | 1/1973 | Skoyles | 303/21 F X |
| 3,738,712 | 6/1973 | Flory | 303/21 F |
| 3,801,162 | 4/1974 | Masuda | 303/10 X |
| 3,802,748 | 4/1974 | Michellone | 303/21 F |
| 3,819,236 | 6/1974 | Fink et al. | 303/21 F |

*Primary Examiner*—Trygve M. Blix
*Assistant Examiner*—Douglas C. Butler
*Attorney, Agent, or Firm*—Oblon, Fisher, Spivak, McClelland & Maier

[57] ABSTRACT

A powered brake system for vehicles including wheel brake cylinders, a pump powered hydraulic pressure source, a reservoir hydraulically connected to the pump powered hydraulic pressure source, a control valve interposed between the wheel brake cylinders and the pump powered hydraulic pressure source for controlling the fluid pressure to the wheel brake cylinders, a valve interposed between the reservoir and the control valve for connecting the wheel brake cylinders to either one of the reservoir and the control valve, and an orifice valve interposed between the control valve and the valve for slowly supplying the fluid pressure from the control valve to the valve just when the fluid pressure of the control valve reaches the point where the pressure is higher than that of the wheel brake cylinders.

7 Claims, 11 Drawing Figures

3,975,061

POWERED BRAKE SYSTEM FOR VEHICLES

BACKGROUND OF THE INVENTION

1. Field of the Invention

The present invention relates generally to a powered brake system, and more particularly to a powered brake system with an anti-skid device.

2. Description of the Prior Art

In general, the communication between a control valve and wheel brake cylinders is cut off by an anti-skid device for a powered brake system according to a skid condition and the brake fluid pressure is drained to a reservoir. Thereby, the brake fluid pressure is controlled and the anti-skid operation is attained. However, in such a system the quantity of fluid pressure for the wheel brake cylinders is small, such that control of the fluid pressure speed to the wheel brake cylinders is difficult, and it is generally required that an orifice be disposed between the anti-skid valve and the reservoir. Furthermore, it is generally required that a second orifice be disposed between the control valve and the ant-skid valve. Since the second orifice is disposed between the control valve and the anti-skid valve, transmission of the fluid pressure into the wheel brake cylinders is delayed by such second orifice during a normal braking operation. Therefore the response during a normal braking operation becomes extremely reduced. In order to eliminate this drawback, an electromagnetic valve is in addition provided between the control valve and the anti-skid valve, and the fluid pressure going into the wheel brake cylinders is passed through the second orifice only upon the anti-skid actuation and under normal operation is bypassed. However, in such a system, the electromagnetic valve must be additionally provided.

SUMMARY OF THE INVENTION

It is therefore an object of the present invention to provide an improved powered brake system with an anti-skid device for obviating the above conventional drawback.

Another object of the present invention is to provide an improved powered brake system with anti-skid device which may respond exactly upon an anti-skid condition.

Still another object of the present invention is to provide an improved powered brake system with an anti-skid device which may continuously supply fluid pressure for a braking operation upon anti-skid actuation by distinguishing from a damaged brake circuit.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
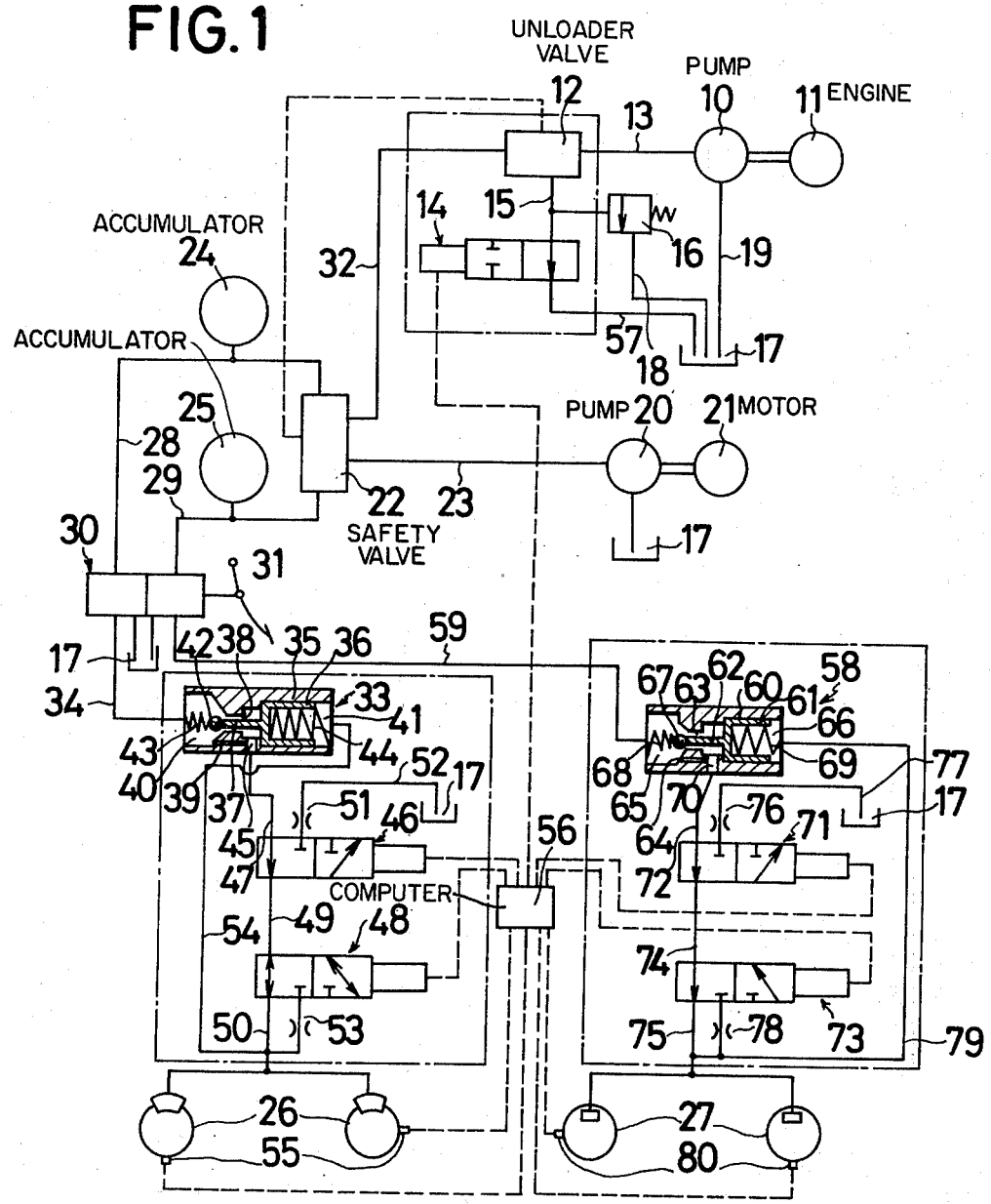
FIG. 1 is a schematic view of a powered brake system with an anti-skid device constructed according to the present invention.

Referring now to FIG. 1, a pump 10 is illustrated as being driven by an engine 11, and an unloader valve 12 is connected to the pump 10 through a conduit 13 and is actuated by an electromagnetic valve 14 upon an anti-skid actuation. The unloader valve 12 and the electromagnetic valve 14 are connected through a conduit 15. A relief valve 16 is connected to the conduit 15 and is further connected to a reservoir 17 through a conduit 19. A pump 20, driven by a motor 21, is activated only when the pump 10 is damaged. A safety valve 22 is connected to the pump 20 through a conduit 23. Accumulators 24, 25 for front or rear brakes 26, 27 are disposed within conduits 28, 29 between the safety valve 22 and a control valve 30 which is actuated by brake pedal 31. The unloader valve 12 and the safety valve 22 are connected through a conduit 32.

An orifice valve 33 is connected to the control valve 30 through a conduit 34 and includes a housing 36 with a piston 35 slidably disposed within the housing 35 and provided with a projection 37 at the left end portion thereof. Projection 37 is slidable within a passage 38 provided in the housing 35. An orifice 39 is provided in the housing 35, and first and second chambers 40, 41 are formed within the housing 35. A ball 42 is disposed within the first chamber 40 and is urged rightwardly by a first spring 43. A second spring 44 is disposed within the second chamber 41 for urging the piston 36 against the urging force of the first spring 43, and a port 45 is also formed in the housing 35. The port 45 is connected to a main valve 46 of the anti-skid device through a conduit 47 and this main valve 46 is further connected to a by-pass valve 48 of the anti-skid device through a conduit 49. The by-pass valve 48 is connected to the front brake 26 through a conduit 50. An orifice 51 is provided in a conduit 52 between the reservoir 17 and the main valve 46, and an orifice 53 is interposed in a conduit 54 between the second chamber 41 of the orifice valve 33 and by-pass valve 48. A sensor 55 is attached to the front brake 26, and a computer 56 is electrically connected to the electromagnetic valve 14, the sensor 55 of the front brake 26, the main valve 46 and the by-pass valve 48. The electromagnetic valve 14 is connected to the reservoir 17 through a conduit 57.

Figure 2:
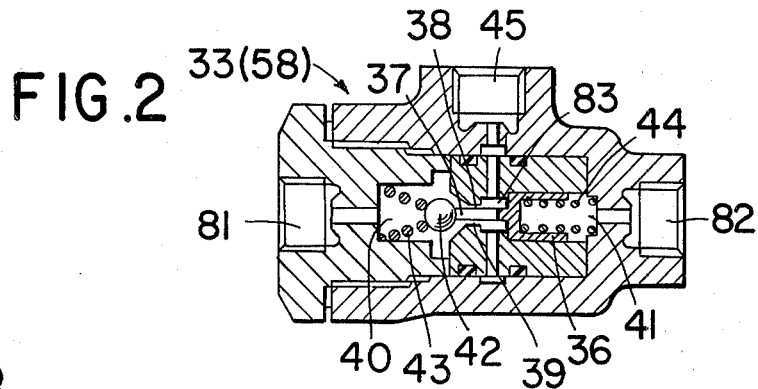
FIG. 2 is a partially sectional view of an orifice valve used in FIG. 1.

An orifice valve 58 is connected to the control valve 30 through a conduit 59 and includes a housing 60 with a piston 61 slidably disposed within the housing 60 and provided with a projection 62 at the left end portion thereof. Projection 62 is slidable within a passage 63 provided in the housing 60. An orifice 64 is provided in the housing 60 and first and second chambers 65, 66 are formed within the housing 60. A ball 67 is disposed within the first chamber 65 and is urged rightwardly by a first spring 68. A second spring 69 is disposed within the second chamber 66 for urging the piston 61 against the urging force of the first spring 68, and a port 70 is also formed in the housing 60. The port 70 is connected to a main valve 71 of the anti-skid device through a conduit 72 and this main valve 71 is further connected to a by-pass valve 73 of the anti-skid device through a conduit 74. The by-pass valve 73 is connected to the rear brake 27 through a conduit 75. An orifice 76 is interposed in a conduit 77 between the reservoir 17 and the main valve 71, and an orifice 78 is provided in a conduit 79 between the second chamber 66 of the orifice valve 58 and the by-pass valve 73. A sensor 80 is attached to the rear brake 27, and the computer 56 is electrically connected to the sensor 80 of the rear brake 27, the main valve 71 and the by-pass valve 73. The load of the second spring 44 is higher than that of the first spring 43 and the load of the second spring 69 is higher than that of the first spring 68. As is best seen from FIG. 2, the first chamber 40 is connected to the conduit 34 through a port 81 and the second chamber 41 to the conduit 54 through a port 82 and the port 45 to a third chamber 83. Only the orifice valve 33 is shown in FIG. 2. However, the orifice valve 33 and the orifice valve 58 are of the same construction and operation.

The operation of the invention will now be described hereinbelow in detail.

When the brake pedal 31 is depressed by a vehicle driver in a normal braking operation, the pressurized fluid is transmitted to the main valve 46 of the anti-skid device through the conduit 34, the chamber 40 of the orifice valve 33, the passage 38, the chamber 83, the port 45 and the conduit 47. The above-mentioned pressurized fluid is further transmitted to the by-pass valve 48 through the conduit 49 and finally to the front brake 26 through the conduit 50. During this time, the pressurized fluid created within the control valve 30 by depression of the brake pedal 31 is transmitted to the rear brake 27 through the same course as with the front brake 26, such that the operation concerning the front brake 26 and the orifice valve 33 will now be described. Upon supplying the pressurized fluid into the front brake 26, the pressurized fluid is transmitted to the chamber 41 of the orifice valve 33 through a conduit 50, the conduit 54 and the port 82 such that the same pressure is oppositely applied to the piston 36 at the right and left hand sides thereof. However, piston 36 is constructed such that the load of the spring 44 is higher than that of spring 43 such that the piston 35 is moved leftwardly by the urging force of the spring 44 and the passage 38 is opened by movement of the ball 42 by the projection 37. Communication between the chambers 40, 83 is attained through the passage 38 and the pressurized fluid from the control valve 30 is transmitted to the front brake 26 through the above-mentioned course. When the depressing force of the brake pedal 31 is released, the pressurized fluid is decreased through the passage 38.

Upon an anti-skid actuation, when a signal for the anti-skid action is generated by the computer 56 according to the skid conditions of the vehicle wheels, such that the front brake 26, for example, is locked or likely to be locked, the electromagnetic valve 14 is energized and the pressurized fluid is transmitted from the unloader valve 12 to the safety valve 22 through the conduit 32. At this time, when the main valve 46 is energized by a signal from the computer 56, the pressurized fluid of the front brake 26 is transmitted from the conduit 50 to the main valve 46 through the by-pass valve 48, the conduit 49, and further to the reservoir 17 through the orifice 51. The brake pressure is decreased according to the speed determined by the orifice 51. When the by-pass valve 48 is energized by a signal from the computer 56, the pressurized fluid of the front brake 26 is transmitted from the conduit 50 to the main valve 46 through the orifice 53, the by-pass valve 48 and the conduit 49 and further to the reservoir 17 through the orifice 51. The brake pressure is further decreased according to the low speed determined by the orifices 53, 51.

When the braking pressure is decreased and the skid condition is released, the main valve 46 goes to a non-actuating state and the piston 36 of the orifice valve 33 is urged rightwardly against the urging force of the spring 44 by the difference between the pressure from the control valve 30 and the pressure from the wheel brake 26. The passage 38 is cut off by the ball 42, such that the pressurized fluid from the control valve 30 is transmitted through the orifice 39, the port 45, the conduit 47 and the main valve 46 and further to the front brake 26 through the conduit 49, the by-pass valve 48 and the conduit 50. Accordingly, the braking pressure to the front brake 26 is increased according to the speed determined by the orifice 39 and the braking actuation is continued. The by-pass valve 48 is actuated during the increase of braking pressure in the same manner as with the decrease of brake pressure. The pressurized fluid to the front brake is increased according to the speed determined by the orifices 39, 53.

Figure 3:
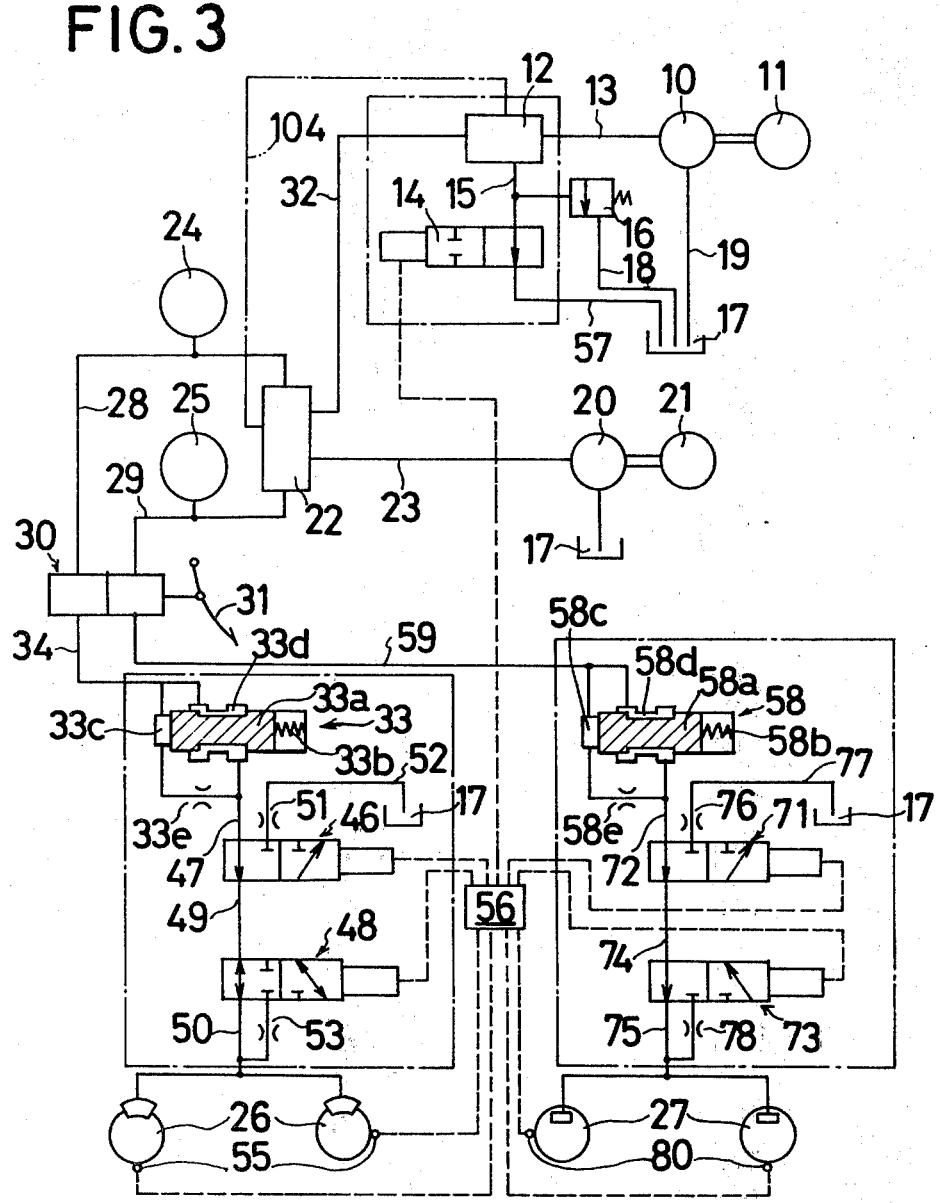
FIG. 3 is a similar view to FIG. 1, however, showing a second embodiment.

Referring now to FIG. 3, that portion of the construction and operation which differs from FIG. 1 will be described hereinbelow in detail. A spool 33a of the orifice valve 33 is held by a spring 33b in the position shown in FIG. 3. When the control valve 30 is actuated by depressing the brake pedal 31, the fluid pressurized by the control valve 30 is transmitted into a chamber 33c of the orifice valve 33 through the conduit 34. The spool 33a is moved rightwardly by the pressurized fluid and the fluid pressure transmitted to the conduit 47 through a chamber 33d is cut off by the spool 33a. Thereafter, the fluid pressure from the control valve 30 is transmitted to the conduit 47 through an orifice 33e.

Figure 4:
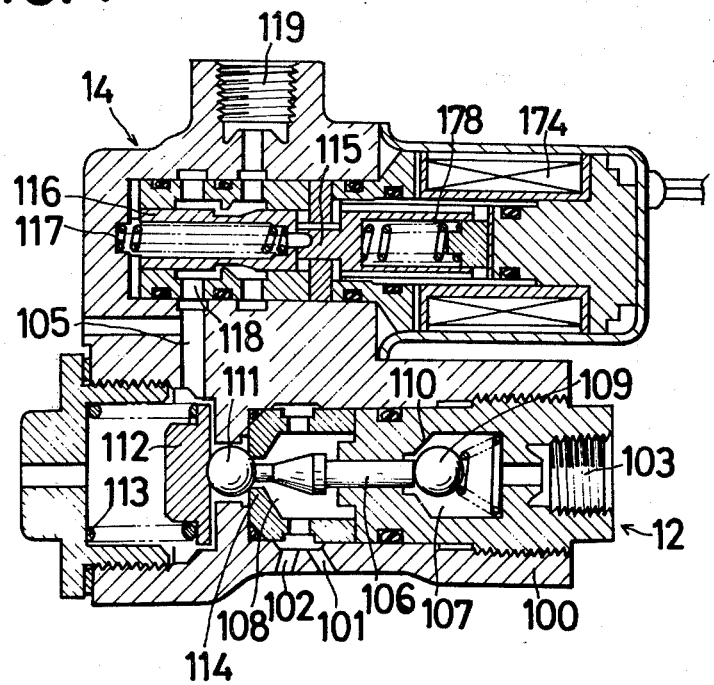
FIG. 4 is a sectional view of an unloader valve and an electromagnetic valve used in FIG. 3.

Referring now to FIG. 4, the unloader valve 12 and the electromagnetic valve 14 are constructed integrally with each other. An inlet port 101 is formed in a housing 100 and is connected to the pump 10. An outlet port 102 is connected to the safety valve 22. An inlet port 103 of the housing 100 is connected to the safety valve 22 through a conduit 104 and an outlet port 105 is connected to the electromagnetic valve 14. The right end of a spool 106 is exposed in a chamber 107 and the left end thereof in a chamber 108. The average sealing area of a ball 109 upon seating on a valve seat 110 is larger than the cross-sectional area of the portion of the spool 106 which is slidably inserted. A ball 111 is rightwardly urged by a spring 113 through a holder 112 and is seated on a valve seat 114. The discharging hydraulic fluid from the pump 10 is normally supplied to the inlet port 101, and when the ball 111 is seated on the valve seat 114, this discharging hydraulic fluid from the pump 10 is applied to the safety valve 22 through the outlet port 102 and is accumulated into the accumulators 24, 25. An input pressure is always supplied to the inlet port 103 from the safety valve 22 through the conduit 104. Approximately the same fluid pressure is generated within chambers 108 and 107 in the state shown in FIG. 4. When a certain accumulation is attained in the accumulators 24, 25, the valve 111 is released from the valve seat 114 against the biasing force of the spring 113 by the fluid pressure within the chamber 108. Accordingly, the input fluid pressure from the inlet port 101 is drained into the reservoir 17 through the chamber within which is disposed the spring 113, the outlet port 105, the electromagnetic valve 14 and the conduit 57, and the fluid pressure within the chamber 108 is decreased. When the ball 111 is released from the valve seat 114, as above mentioned, the spool 106 is moved leftwardly with the leftward movement of the ball 111 by the pressure difference between the chamber 108 and the chamber 107. The ball 109 is then seated on the valve seat 110. The average sealing cross-sectional area of the ball 109 is larger than the cross-sectional area of the spool 106 such that the leftward depressing force acting on the spool 106 is further increased by the pressure difference between the chamber 108 and the chamber 107. The spool 106 is held in the leftward position and the ball 111 is maintained out of contact with the valve seat 114. Therefore, the discharging hydraulic fluid is drained into the reservoir 17 through the chamber 108 and the outlet port 105. In this state, the discharging hydraulic fluid is drained into the reservoir 17, such that the load acting on the pump 10 is at a lower limit. Therefore, the pump 10 is at the unload state.

When the fluid pressure of the accumulators 24, 25, is consumed and the fluid pressure on the load side is decreased, the fluid pressure previously within the chamber 107 is decreased. Therefore, the force leftwardly depressing the spool 106 is overcome by the rightward force. As a result, the ball 107 and the spool 106 return to the state of FIG. 4, and the input hydraulic fluid transmitted into the inlet port 101 is supplied to the accumulators 24, 25 through the outlet port 102 and is accumulated such that the accumulation of a certain pressure is constantly maintained.

The electromagnetic valve 14 includes a solenoid 174 and a plunger 115. The spool 116 is constantly urged rightwardly by a spring 117 and the plunger 115 is leftwardly depressed by a spring 178 such that the spool 115 is held in the state of FIG. 4. When the solenoid 174 is energized, the plunger 115 is moved rightwardly and the spool 116 is also moved rightwardly together with the plunger 115 by the means of the spring 117. The spool 116 is thereby closed. By the closing operation of the spool 116, the outlet port 105 is connected to the reservoir 17 through the chamber 118 and the outlet port 119, and by the opening operation of the spool 116, the outlet port 105 is cut off from the reservoir 17. Therefore, when the solenoid 174 is energized, the unloader valve 12 moves to the unload state even while the ball 111 is released from the valve seat 114. The input hydraulic fluid transmitted to the inlet port 101 is supplied from the outlet port 102 to the safety valve 22 through the conduit 32 even while the ball 111 is released from the valve seat 114.

Figure 5:
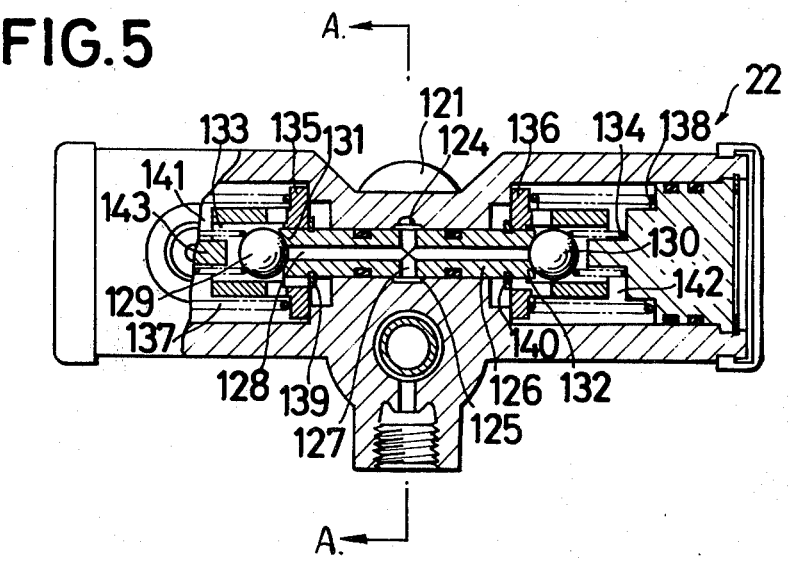
FIG. 5 is a similar view to FIG. 4, however, showing a safety valve used in FIG. 3.
Figure 6:
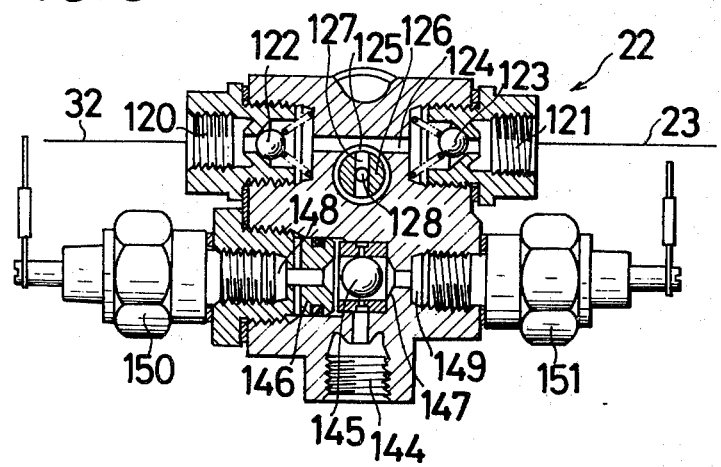
FIG. 6 is a sectional view taken along the line A—A of FIG. 5.

Referring now to FIGS. 5 and 6, the hydraulic fluid from the unloader valve 12 is supplied to an inlet port 120 through the conduit 32. The hydraulic fluid is supplied from the pump 20 to an inlet port 121 through the conduit 23, when an engine, not shown, is damaged. When the engine, not shown, is in the normal condition, a check valve 123 is continuously seated and only the hydraulic fluid from the inlet port 120 is supplied from a passage 124 to an annular chamber 125. The reference numeral 122 is a check valve. A passage 127 is provided on a tubular annular piston 126 and intersects with an axial passage 128. Two balls 129, 130 are urged by springs 133, 134 so as to respectively seat on the valve seats 131, 132 which are mounted on the piston 126. Spring retainers 135, 136 are slidably inserted into the piston 126 and are normally held in the state of FIG. 6 by coil springs 137, 138. Two snap rings 139, 140 mounted on the piston 126 are contacted with the spring retainers 135, 136 at the insides of the spring retainers 135, 136 and the piston 126 is kept in the neutral position as shown in FIG. 6. In FIG. 5, the chambers 141, 142 are respectively connected to the accumulators 24, 25 through the conduits 28, 29. When the fluid pressure is not supplied from the inlet ports 120, 121, the balls 129, 130 are seated. In this state, when one of the accumulators 24, 25 is decreased, for example when the accumulator 24 is decreased, the fluid pressure within a chamber 141 is decreased and the piston 126 is moved leftwardly as seen in FIG. 5 and the ball 129 is depressed to engage a projection 143. In this state, this fluid pressure is not applied to the chamber 141 and is applied only to a chamber 142 even if the fluid pressure from the pump 10 is supplied from one of the inlet ports 120, 121.

However, when the fluid pressure is supplied from the inlet port 120 or the inlet port 121, the hydraulic fluid is supplied to chambers 141 and 142 even if one of these chambers 141, 142 is subject to increase so that a fluid pressure difference does not occur between the chambers 141, 142. Accordingly, the fluid pressure is continuously applied to the accumulators 24, 25 through the chambers 141, 142.

Referring to FIG. 6, an outlet port 144 is shown connected to the inlet port 103 of the unloader valve 12 through the conduit 104 and a pilot pressure is transmitted to the inlet port 103 such that the unloader valve 12 is actuated. Outlet port 144 is connected to one of the chambers 141, 142. The ball 145 is moved into the lower position between chambers 148, 149 and is seated. As a result, the pilot pressure is constantly maintained at the outlet port 144 and is transmitted to the inlet port 103 of the unloader valve 12 through the conduit 104. The reference numerals 150, 151 are pressure responsive switches for detecting an abnormal decreasing condition in the chambers 148, 149.

Figure 8:
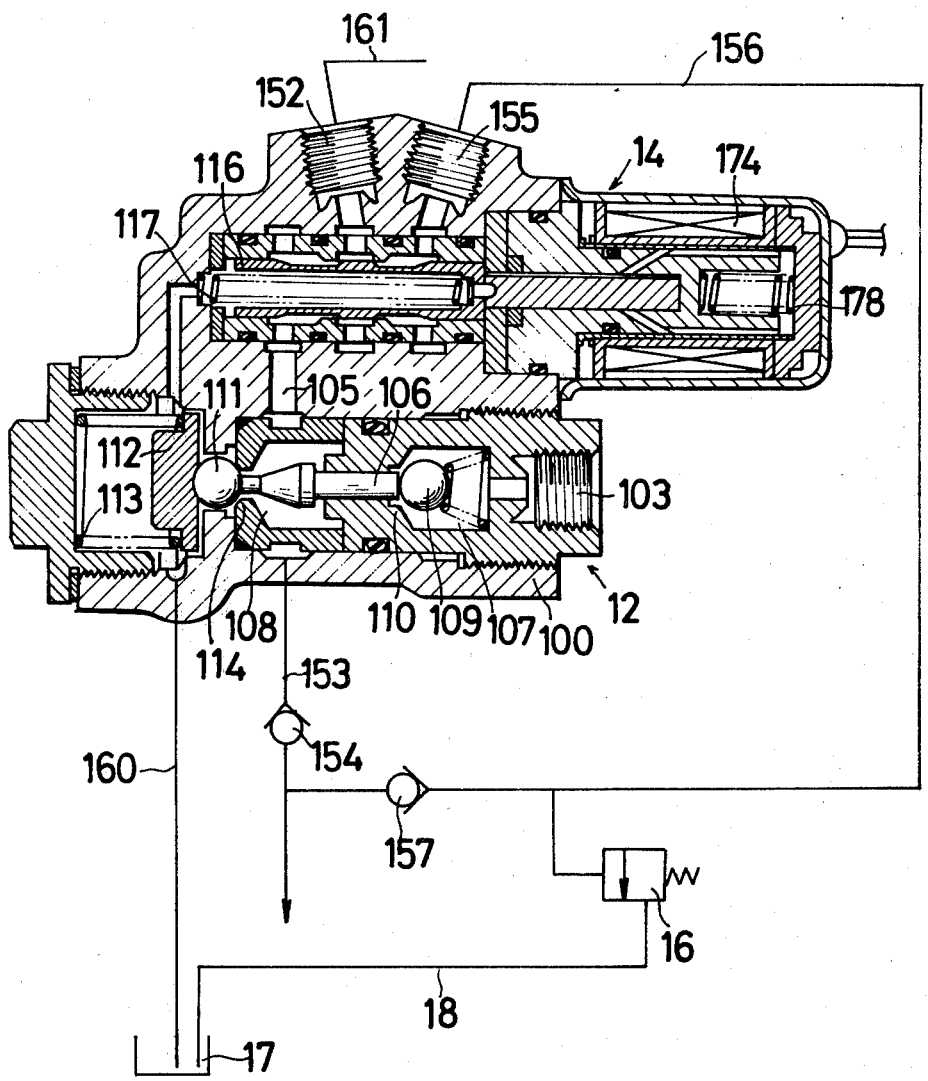
FIG. 8 is a sectional view of an unloader valve and an electromagnetic valve used in FIG. 7.
Figure 7:
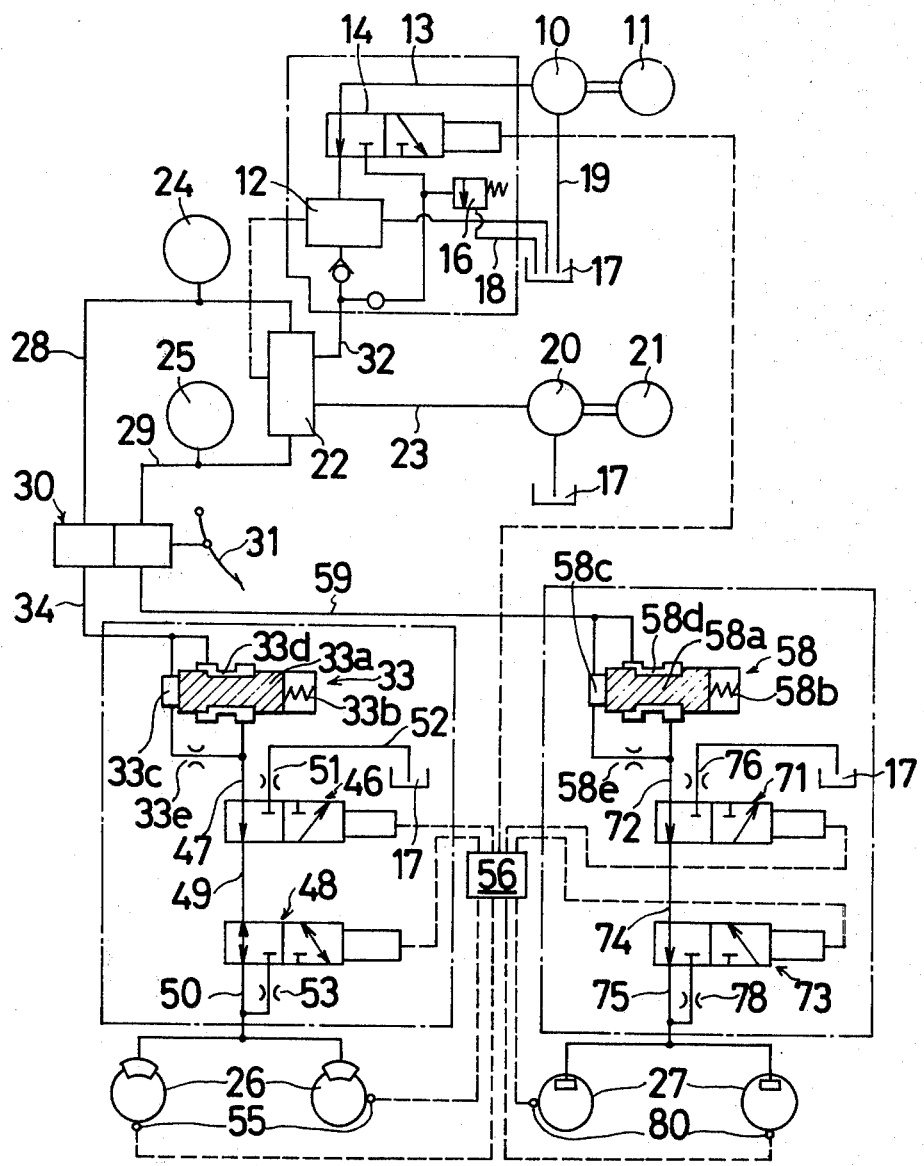
FIG. 7 is a similar view to FIG. 1, however, showing a third embodiment.

Referring now to FIGS. 7 and 8, the portion of the construction and operation which differs from FIGS. 5 and 6, will be described in detail hereinbelow. The fluid pressure from the pump 10 is supplied to an inlet port 152 of the electromagnetic valve 14 and further to the chamber 108 of the unloader valve 12 through the spool 116 and the passage 105. Thereafter, this fluid pressure is applied to the safety valve 22 through a check valve 154 disposed within a conduit 153 and is accumulated in the accumulators 24, 25. This condition is for a non-braking operation in the normal state.

When the front or rear brakes 26, 27 are locked or likely to be locked, this state is sensed by the computer 56 and the electromagnetic valve 14 is then actuated responsive to the signal from the computer 56. By actuating the solenoid 114 of the electromagnetic valve 14, the spool 116 is moved leftwardly and communication between the inlet port 152 and the passage 105 is then cut off, such that the fluid pressure supplied to the inlet port 152 is transmitted from an outlet port 155 to the safety valve 22 through a by-pass conduit 156 and a check valve 157. The fluid pressure from the pump 10 is directly transmitted to the safety valve 22 through the by-pass conduit 156 even when the anti-skid actuation is generated during supply of the hydraulic fluid from the pump 10 to the reservoir 17 by actuation of the unloader valve 12.

Figure 10:
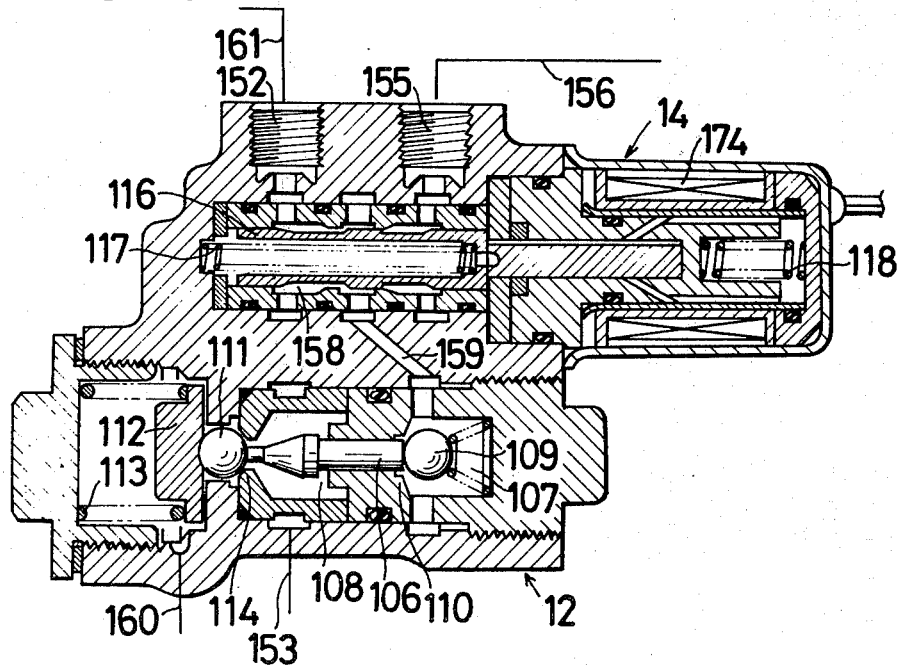
FIG. 10 is a sectional view of an unloader valve and an electromagnetic valve used in FIG. 9.
Figure 9:
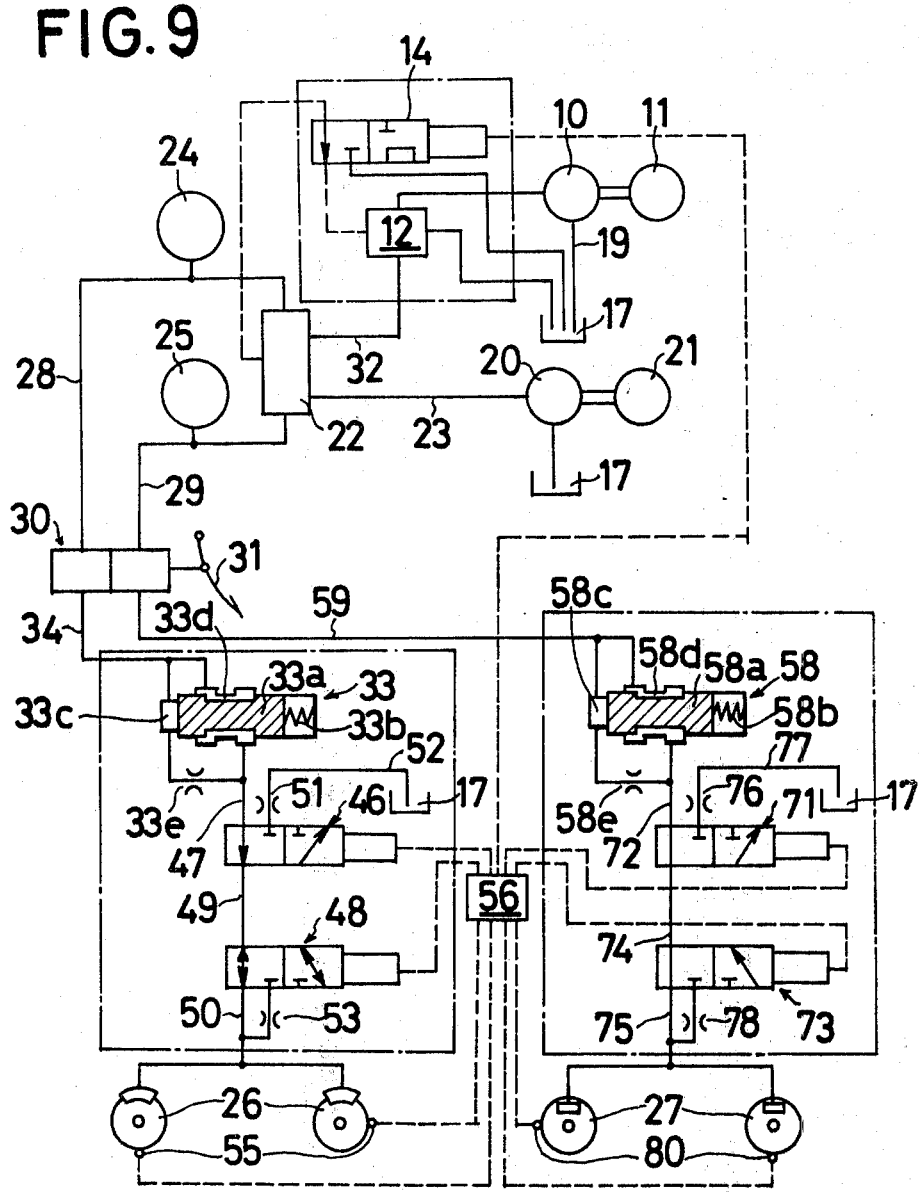
FIG. 9 is a similar view to FIG. 1, however, showing a fourth embodiment.

Referring now to FIGS. 9 and 10, the pilot pressure in this embodiment supplied to the unloader valve 12 is changed to the low pressure of the reservoir 17 upon the anti-skid operation. Thereby, the operation of the unloader valve 12 during non-accumulating actuation is changed to the onload state, namely, accumulating actuation.

The pilot pressure from the safety valve 22 supplied to the inlet port 152 of the electromagnetic valve 14 is transmitted into the chamber 105 by actuation of the spool 116 through the chamber 158, the passage 159 and actuation of the unloader valve is attained. In the antiskid generating state, the spool 116 of the electromagnetic valve 14 is moved leftwardly as viewed in FIG. 10, to create communication between the safety valve 22 and the electromagnetic valve 14. Therefore, the chamber 107 of the pilot pressure is communicated with the reservoir 17 through the passage 159, the outlet port 155 and the conduit 156. The unloader valve 12 being in the unload state comes to the onload state and fluid pressure is constantly supplied to the accumulators 24, 25. The fluid pressure within the chamber 107 of the pilot pressure is decreased to the pressure of the reservoir 12 such that the force for leftwardly depressing the spool 116 is weakened. Therefore, the ball 111 is not opened by the fluid pressure transmitted from the conduit 153 to the chamber 108 and the fluid pressure is not supplied to the reservoir 17 through conduit 160 such that the onload state is continued.

Figure 11:
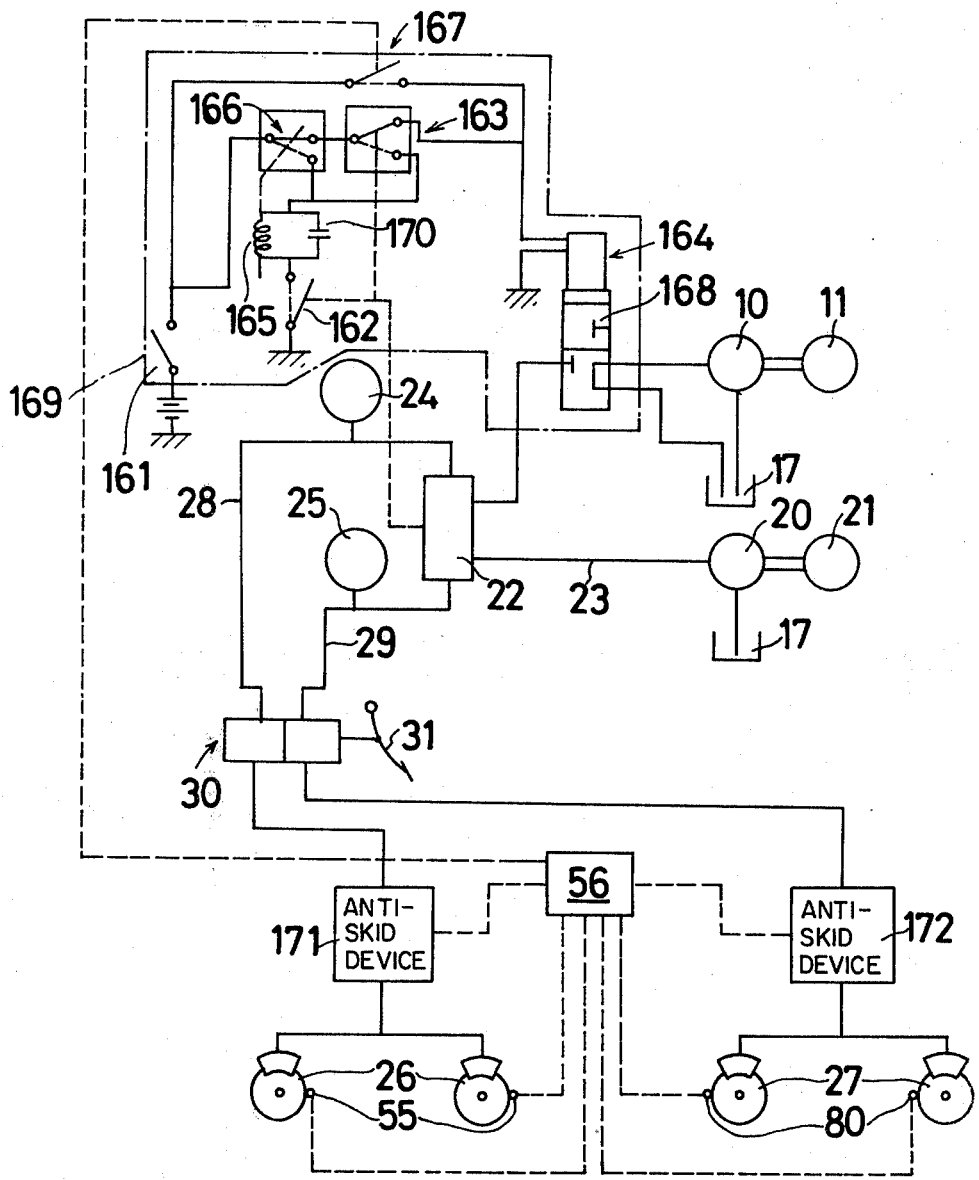
FIG. 11 is a similar view to FIG. 1, however, showing a fifth embodiment.

Referring now to FIG. 11, the reference numeral 161 is a key-switch for starting the engine 11 and the numerals 162, 163 are pressure responsive switches. The numeral 164 is an electromagnetic valve, numeral 165 is a solenoid coil and numeral 166 is a holding switch of a relay. Numeral 167 is a switch for closing in response to the signal from the computer 56.

In the non-braking state, as shown in FIG. 11, the accumulators 24, 25 are under a certain pressure. When the engine key-switch 161 is closed in this state and the eninge 11 is started, the solenoid circuit of the electromagnetic valve 164 is closed and the electromagnetic valve 164 is energized and changed to the state illustrated by numeral 168. Therefore, the pump 10 and the safety valve 22 are communicated and the accumulators 24, 25 are accumulated.

When the first predetermined pressure is obtained by the accumulators 24, 25, the first pressure responsive switch 162 is closed as shown by dotted line. However, the second pressure responsive switch 163 is opened, as viewed in FIG. 11, such that the relay coil is not energized. The electromagnetic valve 164 is continuously energized in the state shown by numeral 168. When the second predetermined pressure is obtained by further accumulation of the accumulators 24, 25, the second pressure responsive switch 163 is changed to the dotted line position. Consequently, the electric current flows to the relay coil 165 and the relay coil 165 is energized. The holding switch 166 is momentarily changed to the dotted line position and this state is continued. The electromagnetic valve 164 comes to a non-energized state, as seen in FIG. 11, and the pump 10 is connected to the reservoir 17 and the accumulation is stopped.

When the fluid pressure of the accumulators 24, 25 is consumed and lowered and then is lowered to a second predetermined pressure, the pressure responsive switch 163 is changed to the solid line position, as seen in FIG. 11. However, the coil 165 is continuously energized through the switch 166 during the closing operation as shown by dotted line. Accordingly, the electromagnetic valve 164 maintains the non-energized state as shown by solid line. When the fluid pressure of the accumulators 24, 25 is lowered and lowered to the first predetermined pressure, the first pressure responsive switch is opened to the solid line position. As a result, the coil 165 comes to a nonenergized state and the switch 166 is changed to the solid line position. The switches 166, 162, 163 come to the solid line position, as viewed from FIg. 11, and the electromagnetic valve 164 is again energized and changed to the dotted line position 168, such that accumulation is begun. By repeating the above captioned operation, the fluid pressure of the accumulators 24, 25 is kept at a first and second predetermined pressure.

When the anti-skid operation is generated, the switch 167 is closed, as seen by a dotted line. The electromagnetic valve 164 comes to the energized state and is connected with the safety valve 22. At this time, even if the electromagnetic valve 164 was previously in the energized state 168 by another circuit the above-mentioned state is also obtained.

When anti-skid devices 171, 172 are actuated, the switch 167 is closed as shown in dotted line, and the pump 10 is connected to the safety valve 22 by actuation of the electromagnetic valve 164. When the switch 166 is changed from the state of the solid line to the state of a dotted line and while the coil 165 is momentarily cut off from an electric source, not shown, a condensor 170 supplies the electric current for maintaining the coil 165 in the energized state.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the U.S. is:

1. A powered brake system for vehicles comprising:
wheel brake cylinders;
a pump powered hydraulic pressure source;
a reservoir hydraulically connected to said pump powered hydraulic pressure source;
control valve means interposed between said wheel brake cylinders and said pump powered hydraulic pressure source for controlling the fluid pressure to said wheel brake cylinders;
valve means interposed between said reservoir and said control valve means for connecting said wheel brake cylinders to either one of said reservoir and said control valve means; and
orifice valve means interposed between said control valve means and said valve means for slowly and rapidly supplying the fluid pressure from said control valve means to said valve means in accordance with the pressure difference between said control valve means and one of said wheel brake cylinders under anti-skid conditions of said vehicle, wherein said orifice valve means includes an orifice means for communicating said control valve means and said valve means just when the fluid pressure of said control valve means reaches a point higher than that of one of said wheel brake cylinders, and a housing, a piston slidably disposed within said housing and provided with a projection at an end portion thereof, a passage provided in said housing for slidably moving said projection, first and second chambers formed within said housing, a ball disposed within said first chamber and adapted to be seated upon a valve seat interposed between said first and second chambers so as to block communication between said control valve means and said valve means, a first spring disposed within said first chamber for urging said ball into the non-communicating direction between said control valve means and said valve means, a second spring disposed within said second chamber for urging said piston against the urging force of said first spring, and a third chamber connected to said valve means.

2. A powered brake system for vehicles comprising:
wheel brake cylinders;
a pump powered hydraulic pressure source;
a reservoir hydraulically connected to said pump powered hydraulic pressure source;
control valve means interposed between said wheel brake cylinders and said pump powered hydraulic pressure source for controlling the fluid pressure to said wheel brake cylinders;
valve means interposed between said reservoir and said control valve means for connecting said wheel brake cylinders to either one of said reservoir and said control valve means; and
orifice valve means interposed between said control valve means and said valve means for slowly and rapidly supplying the fluid pressure from said control valve means to said valve means in accordance with the pressure difference between said control valve means and one of said wheel brake cylinders under anti-skid conditions of said vehicle,
wherein said valve means includes a main control valve electromagnetically actuated according to the skid condition of said wheel brake cylinders and a by-pass valve electromagnetically actuated according to the skid condition of said wheel brake cylinders.

3. A powered brake system for vehicles as set forth in claim 2, wherein said main control valve includes an orifice means.

4. A powered brake system for vehicles as set forth in claim 2, wherein said by-pass valve includes an orifice means.

5. A powered brake system for vehicles comprising:
wheel brake cylinders;
a pump powered hydraulic pressure source;
a reservoir hydraulically connected to said pump powered hydraulic pressure source;
control valve means interposed between said wheel brake cylinders and said pump powered hydraulic pressure source for controlling the fluid pressure to said wheel brake cylinders;
valve means interposed between said reservoir and said control valve means for connecting said wheel brake cylinders to either one of said reservoir and said control valve means;
orifice valve means interposed between said control valve means and said valve means for slowly and rapidly supplying the fluid pressure from said control valve means to said valve means in accordance with the pressure difference between said control valve means and one of said wheel brake cylinders under anti-skid conditions of said vehicle;
accumulators connected to said control valve means;
unloader valve means for supplying or cutting off the discharging hydraulic fluid of said pump powered hydraulic pressure source to said accumulators according to the fluid pressure within said accumulators;
safety valve means interposed between said accumulators and said unloader valve means for distributing the hydraulic fluid from said unloader valve means to said accumulators and for cutting off the hydraulic fluid to lower one of said accumulators, when the fluid pressure difference between said accumulators is attained, to a predetermined value; and
means for constantly maintaining the loading state of said unloader valve means regardless of the state of said unloader valve means upon anti-skid operation.

6. A powered brake system for vehicles as set forth in claim 5, wherein said means for constantly maintaining the loading state of said unloader valve means is an electromagnetic valve operatively connected to said unloader valve and actuated according to the anti-skid operation.

7. A powered brake system for vehicles comprising:
wheel brake cylinders;
a pump powered hydraulic pressure source;
a reservoir hydraulically connected to said pump powered hydraulic pressure source;
control valve means interposed between said wheel brake cylinders and said pump powered hydraulic pressure source for controlling the fluid pressure to said wheel brake cylinders;
valve means interposed between said reservoir and said control valve means for connecting said wheel brake cylinders to either one of said reservoir and said control valve means; and
orifice valve means interposed between said control valve means and said valve means for slowly and rapidly supplying the fluid pressure from said control valve means to said valve means in accordance with the pressure difference between said control valve means and one of said wheel brake cylinders under anti-skid conditions of said vehicle,
wherein said orifice valve means includes a first fluid chamber fluidically connected to said control valve means by means of a first conduit, a second conduit connecting said first chamber to said valve means, an orifice disposed within said second conduit, a second fluid chamber fluidically connected to said control valve means by means of a third conduit, a fourth conduit connecting said second chamber to said valve means, and a spring-biased spool reciprocable within said orifice valve means so as to permit or prevent fluid communication through said second chamber between said third and fourth conduits in response to the fluid pressure within said first chamber.

* * * * *